United States Patent
Sujan et al.

(10) Patent No.: US 10,000,197 B2
(45) Date of Patent: Jun. 19, 2018

(54) MILD HYBRID POWERTRAIN CONTROLS

(71) Applicant: Cummins Inc., Columbus, IN (US)

(72) Inventors: Vivek A. Sujan, Columbus, IN (US); Arun Prakash Thunga Gopal, Columbus, IN (US); Subbarao Varigonda, Columbus, IN (US); Jaroslaw Leonarski, Columbus, IN (US); Praveen Chitradurga Muralidhar, Ann Arbor, MI (US)

(73) Assignee: Cummins Inc., Columbus, IN (US)

( * ) Notice: Subject to any disclaimer, the term of this patent is extended or adjusted under 35 U.S.C. 154(b) by 36 days.

(21) Appl. No.: 15/233,576

(22) Filed: Aug. 10, 2016

(65) Prior Publication Data

US 2017/0043757 A1     Feb. 16, 2017

Related U.S. Application Data (60) Provisional application No. 62/203,104, filed on Aug. 10, 2015.

(51) Int. Cl.

| | |
|---|---|
| *B60W 20/10* | (2016.01) |
| *B60W 10/08* | (2006.01) |
| *B60W 10/06* | (2006.01) |
| *B60K 6/485* | (2007.10) |
| *B60W 20/11* | (2016.01) |

(52) U.S. Cl.
CPC ............ *B60W 10/08* (2013.01); *B60K 6/485* (2013.01); *B60W 10/06* (2013.01); *B60W 20/11* (2016.01); *B60W 2510/244* (2013.01); *B60W 2710/0677* (2013.01); *B60W 2710/086* (2013.01); *B60W 2710/244* (2013.01); *Y02T 10/6226* (2013.01); *Y02T 10/6286* (2013.01); *Y10S 903/93* (2013.01)

(58) Field of Classification Search
CPC .............................. B60L 3/003; B60W 20/10
See application file for complete search history.

(56) References Cited

U.S. PATENT DOCUMENTS

| | | |
|---|---|---|
| 6,515,446 B1 | 2/2003 | Koide et al. |
| 6,907,325 B1 | 6/2005 | Syed et al. |
| 7,507,181 B2 | 3/2009 | Fenkart et al. |
| 7,755,310 B2 | 7/2010 | West et al. |

(Continued)

*Primary Examiner* — Ryan Rink
(74) *Attorney, Agent, or Firm* — Taft Stettinius & Hollister LLP (57) ABSTRACT

Mild hybrid powertrain controls and apparatuses, methods and systems including the same are disclosed. One exemplary embodiment is a mild-hybrid system comprising an engine, an electrical machine, power electronics, an energy storage system, and an electrical load. The system includes a controller structured to receive an electrical machine power command based upon a power allocation to the electrical machine, process the electrical machine power command with feedforward controls structured to compensate for an inaccuracy associated with the power electronics, process the electrical machine power command with proportional integral (PI) controls structured to compensate for a power loss associated with one or more electrical loads, provide a compensated machine power command based upon the processing with the feedforward controls and the processing with the PI controls, and output the compensated machine power command to control the electrical machine.

23 Claims, 4 Drawing Sheets

(56) References Cited

U.S. PATENT DOCUMENTS

| | | | |
|---|---|---|---|
| 8,155,815 B2 | 4/2012 | Cawthorne et al. | |
| 8,392,057 B2 | 3/2013 | Wright et al. | |
| 8,417,431 B2 | 4/2013 | Okubo et al. | |
| 2004/0108831 A1* | 6/2004 | Cartwright | B60W 10/08 320/104 |
| 2009/0066281 A1* | 3/2009 | West | B60L 3/00 318/434 |
| 2014/0001991 A1* | 1/2014 | Nishibata | H02P 6/10 318/400.23 |
| 2014/0172214 A1* | 6/2014 | Kim | B60W 20/10 701/22 |
| 2015/0266466 A1* | 9/2015 | Johri | B60W 10/06 701/22 |
| 2016/0031428 A1* | 2/2016 | Sun | B60W 20/10 701/22 |
| 2016/0046276 A1* | 2/2016 | Martin | B60W 10/06 701/22 |
| 2016/0052505 A1* | 2/2016 | Zhou | B60L 7/14 701/22 |
| 2016/0082861 A1* | 3/2016 | Gauthier | B60L 11/1874 165/287 |
| 2016/0114788 A1* | 4/2016 | Kamatani | B60K 6/445 701/22 |
| 2016/0315479 A1* | 10/2016 | Ide | H02M 3/158 |
| 2016/0318503 A1* | 11/2016 | Zhou | B60L 7/14 |

* cited by examiner

MILD HYBRID POWERTRAIN CONTROLS

BACKGROUND

The present application relates generally to mild hybrid powertrain controls and more particularly but not exclusively to controls for correction and/or compensation of motor/generator torque in mild hybrid systems. For future medium duty and heavy duty applications a variety of mild hybrid architectures are being considered. Mild hybrid architectures can take advantage of low cost components and minimize part proliferation varieties for multiple application and/or markets. In mild hybrid systems, devices such as electrical machines (e.g., motor/generators) and their associated power electronics (e.g., inverters and converters) are preferably robust, relatively high efficiency, and simple.

Controls for mild hybrid systems typically determine and send commands to control a motor/generator to provide torque to assist the engine in vehicle propulsion or receive torque to generate power for charging an energy storage system and/or powering electrical loads. Such commands typically depend, directly or indirectly, upon motor/generator torque determination which is influenced by current measurements associated with the energy storage system. Heretofore mild hybrid controls were believed to be effective to provide desired commands for motor/generator torque assist operation and generator operation. Surprisingly, the inventors have discovered that this is not always true. For example, it has now been realized that such controls may suffer from lower than desired current output during commanded torque assist operation. Such controls may further suffer from current reversal such that current to the energy storage system flows in a direction associated with power generation rather than torque assist which is desired. Such problems may arise at higher engine speeds or loads as well as at lower engine speeds or loads where neither power generation nor torque assist is desired. These unexpected problems create a number of undesired consequences including decreased efficiency, degradation of energy storage system function and life and substandard vehicle performance. These and other challenges with mild hybrid controls demonstrate that there remains a significant need for the unique apparatuses, methods and systems disclosed herein.

DISCLOSURE

For the purposes of clearly, concisely and exactly describing exemplary embodiments of the invention, the manner and process of making and using the same, and to enable the practice, making and use of the same, reference will now be made to certain exemplary embodiments, including those illustrated in the figures, and specific language will be used to describe the same. It shall nevertheless be understood that no limitation of the scope of the invention is thereby created, and that the invention includes and protects such alterations, modifications, and further applications of the exemplary embodiments as would occur to one skilled in the art.

SUMMARY

Exemplary embodiments include mild hybrid powertrain controls and apparatuses, methods and systems including the same. One exemplary embodiment is a mild-hybrid system comprising an engine, an electrical machine, power electronics, an energy storage system, and an electrical load. The system includes a controller structured to receive an electrical machine power command based upon a power allocation to the electrical machine, process the electrical machine power command with feedforward controls structured to compensate for an inaccuracy associated with the power electronics, process the electrical machine power command with proportional integral (PI) controls structured to compensate for a power loss associated with one or more electrical loads, provide a compensated machine power command based upon the processing with the feedforward controls and the processing with the PI controls, and output the compensated machine power command to control the electrical machine.

DETAILED DESCRIPTION OF ILLUSTRATIVE EMBODIMENTS

Figure 1:
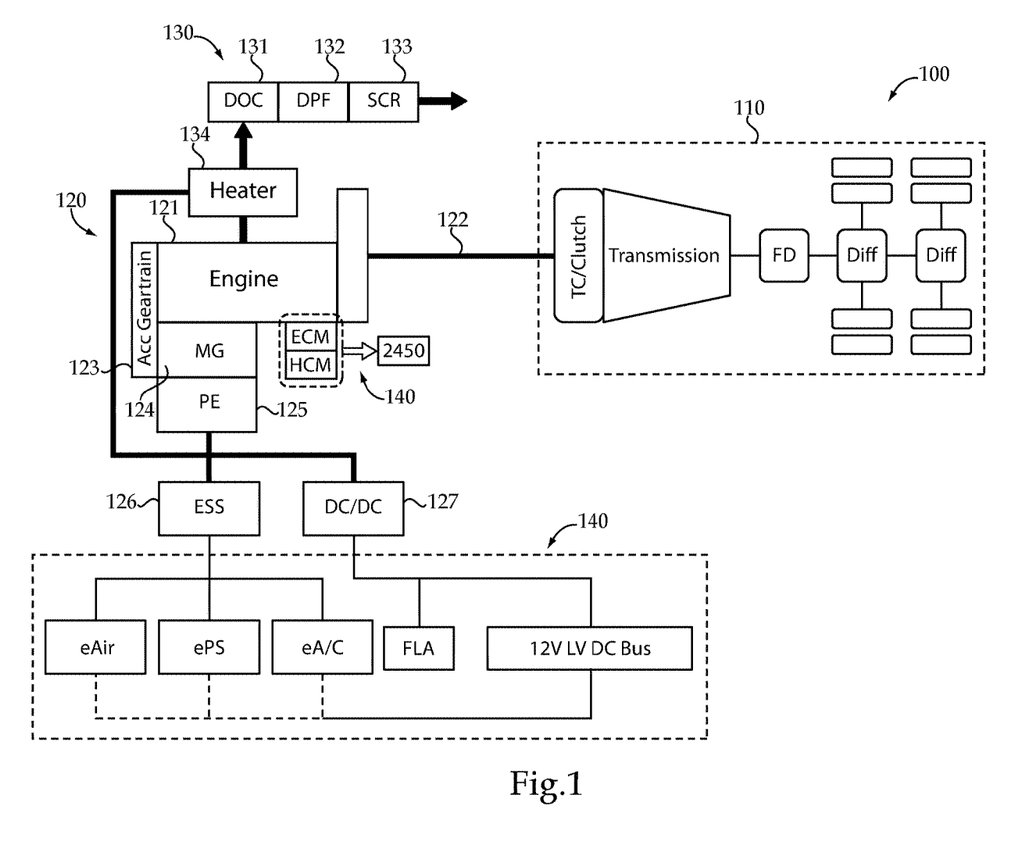
FIG. 1 is a schematic block diagram illustrating an exemplary mild hybrid powertrain system.

With reference to FIG. 1 there is illustrated a schematic block diagram of an exemplary mild hybrid powertrain system 100 structured for use in a vehicle. Mild hybrid systems preferably include internal combustion engines equipped with an electrical machine (e.g., a motor/generator) and an energy storage system allowing the engine to be turned off under a variety of circumstances (e.g., whenever the vehicle is coasting, braking, or stopped) and restarted quickly. Mild hybrid powertrain systems preferably also employ levels of regenerative braking, energy storage, and power or torque assist to the engine that are lower than full hybrid powertrain systems. Additionally, mild hybrids typically do not have an exclusive electric-only mode of propulsion.

System 100 comprises a drivetrain 110 which includes a clutch, a transmission, one or more differentials and ground contacting wheels which are driven to provide vehicle propulsion. System 100 further includes a mild hybrid power system 120 including an internal combustion engine 121 structured to output torque to drivetrain 110 via drive shaft 122 and to output torque to accessory drive 123 which may include geartrain and/or accessory belt drives. An electrical machine 124 (e.g., a motor/generator) is operatively coupled with accessory drive 123 and with power electronics 125 which are, in turn, operatively coupled with energy storage system 126 (which may include one or more batteries, ultracapacitors or other types of energy storage devices) and DC/DC converter 127. An aftertreatment system 130 is structured to receive exhaust from engine 121 and reduce emissions thereof, for example, using a diesel oxidation catalyst 130, diesel particulate filter 131, SCR catalyst 133, and heater 134.

Electrical machine 124 is operatively coupled with engine drive shaft 122 in a selectably controllable torque transfer relationship such that electrical machine 124 can provide torque to assist engine 121 in vehicle propulsion or receive torque for generating electrical power. Such coupling may be via a belt, gear train, other mechanical torque transfer structure or combinations thereof. Such coupling may be indirect via intermediate structure such as accessory drive 123 or direct to drive shaft 122. The operative coupling between electrical machine 124 and drive shaft 122 may be provided as an integrated component of system 100, or may be added as an aftermarket feature installed on a vehicle system not initially configured as a mild hybrid system.

Power electronics 125 may include a bi-directional AC/DC converter or inverter controllable to selectably convert DC power received from energy storage system 126 via a DC bus to AC power for driving electrical machine 124, or to receive electrical power from machine 124 to provide power to energy storage system and/or electrical loads 140 via the DC bus.

A variety of different electrical loads 140 may be operatively coupled with energy storage system 126 and/or DC/DC converter 127. The electrical loads may include an electric air compressor (eAir), electric power steering (ePS), electric air conditioning (eA/C). These loads may be powered by the voltage of energy storage system 126 (e.g., 48V) or at a lower voltage provided by DC/DC converter (e.g., 12 V). In the illustrated embodiment the electrical loads which are operatively coupled with energy storage system 126 and/or DC/DC converter 127 further include electric heater 134 which is used to heat one or more components of exhaust aftertreatment system 130 to provide a desired temperature for emissions mitigation without requiring operation of engine 121 to heat the components of system 130.

During operation of system 100 electrical machine 124 can selectably operate in a torque assist motor mode in which it draws energy from energy storage system 126 and outputs positive torque to accessory drive 123 to assist engine 121 in driving drivetrain 110. Electrical machine 124 can also selectably operate in generator modes in which it receives torque from accessory drive train and generates energy to charge energy storage system 126 and/or power one or more of electrical loads 140. The generator modes may include either or both of a regenerative braking mode in which mechanical torque to drive electrical machine 124 is provided from drivetrain 110 via engine 121 and accessory drive 123 to provide vehicle braking, and an engine charging mode in which mechanical torque output by engine 121 is used to drive electrical machine 124.

System 100 further includes a controller 140 which may be configured to control various operational aspects of system 100. Controller 140 may be implemented in a number of forms. In the illustrated embodiment, controller 140 includes an engine control module (ECM) structured to control operation of engine 121 and hybrid control module (HCM) structured to control operation of electrical machine 124, power electronics 125, energy storage system 126 and converter 127. It shall be appreciated that the HCM and ECM may be structured as separate modules or may alternatively be implemented in a single control module as denoted by box 2450. Controller 140 executes operating logic that defines various control, management, and/or regulation functions. This operating logic may be in the form of one or more microcontroller or microprocessor routines stored in a non-transitory memory, dedicated hardware, such as a hardwired state machine, analog calculating machine, various types of programming instructions, and/or a different form as would occur to those skilled in the art.

As noted above, controller 140 may be provided as a single module, or a collection of operatively coupled modules; and may comprise digital circuitry, analog circuitry, or a hybrid combination of both of these types. When of a multi-module form, controller 140 may have one or more modules remotely located relative to the others in a distributed arrangement. Controller 140 can include multiple processing units arranged to operate independently, in a pipeline processing arrangement, in a parallel processing arrangement, or the like. In one embodiment, controller 140 includes several programmable microprocessing units of a solid-state, integrated circuit type that are disturbed throughout system 100 that each include one or more processing units and non-transitory memory. For the depicted embodiment, controller 140 includes a computer network interface to facilitate communications using standard Controller Area Network (CAN) communications or the like among various system control units. It should be appreciated that the depicted modules or other organizational units of controller 140 refer to certain operating logic performing indicated operations that may each be implemented in a physically separate controller of controller 140 and/or may be virtually implemented in the same controller.

Controller 140 and/or any of its constituent processors/controllers may include one or more signal conditioners, modulators, demodulators, Arithmetic Logic Units (ALUs), Central Processing Units (CPUs), limiters, oscillators, control clocks, amplifiers, signal conditioners, filters, format converters, communication ports, clamps, delay devices, memory devices, Analog to Digital (A/D) converters, Digital to Analog (D/A) converters, and/or different circuitry or functional components as would occur to those skilled in the art to perform the desired communications.

Controller 140 may be configured to perform a variety of control processes in which a total power and a power-split allocation can be determined and utilized in controlling one or more components or sub-systems of system 100. Controller 140 may be configured to implement unique methodologies and processes for controlling mild hybrid powertrains, including basic vehicle control, power-split optimization and energy management, and hardware protection. In certain exemplary embodiments, controller 140 may be configured to manage two mild hybrid power train parameters independently. The first managed parameter is the drive demand power (Pd) (e.g., the total power demanded of the powertrain) which may be determined, for exemplary, using accelerator position, a throttle torque table, idle speed governor, PTO speed governor, cruise control governor, torque limiters, and any other information or criteria useful for engine and vehicle control.

The second managed parameter is the battery state of charge (SOC) which may be managed using a number of techniques including, for exemplary, closed loop control, or open-loop scheduling. This SOC management may have multiple criteria or constraints including power limits due to battery temperature or cell voltages or protection from battery over-use. Or available battery energy might be depleted at minimum SOC, or unable to accept further charge at maximum SOC. SOC management might also be based on a fixed target steady-state SOC, or a variable target based on operating conditions. In one exemplary, SOC is managed independent of Pd, and in such a way that it is possible to determine a battery demand power (Pb) (e.g., instantaneous battery power) which may be determined based on various criteria to satisfy the SOC management criteria.

As shall be appreciated by one of skill in the art, there are a number of physics based relationships among certain metrics and units utilized by the controls disclosed herein. For example, mechanical power is directly proportional to the product of torque and angular speed. As a further example, in the context of electrical machines current is directly proportional to torque and voltage is directly proportional to angular speed. It shall be appreciated that references to related metrics and units as well as to calculations, commands, control operations, estimations, determinations, data, manipulation, processing, variables and other values pertaining thereto may be stated in terms of one or the other of the related values in the interest of clear and concise description. Such expression shall be understood as inclusive of related values rather than limiting unless expressly stated to the contrary. For example, quantities expressed in units of power, such as Pd, Pb and other quantities and values disclosed herein, may also be expressed in and should be understood as encompassing units of torque, other units which correlate with power or torque, or dimensionless scales which correlate with power or torque, unless stated to the contrary.

For power-split, the electrical power allocation may be based upon Pb and the engine allocation may be based upon the remaining power (Pd−Pb). In certain instances one or more subsystems may be unable to achieve its allocated power due to a capacity or derate constraint. Reallocation may be performed under these conditions. Reallocation may be performed by applying boundary limits on one subsystem and recalculating the complementary devices allocation based on the known total. Further details of an exemplary power split controls are illustrated and described in connection with FIG. 3.

Figure 2:
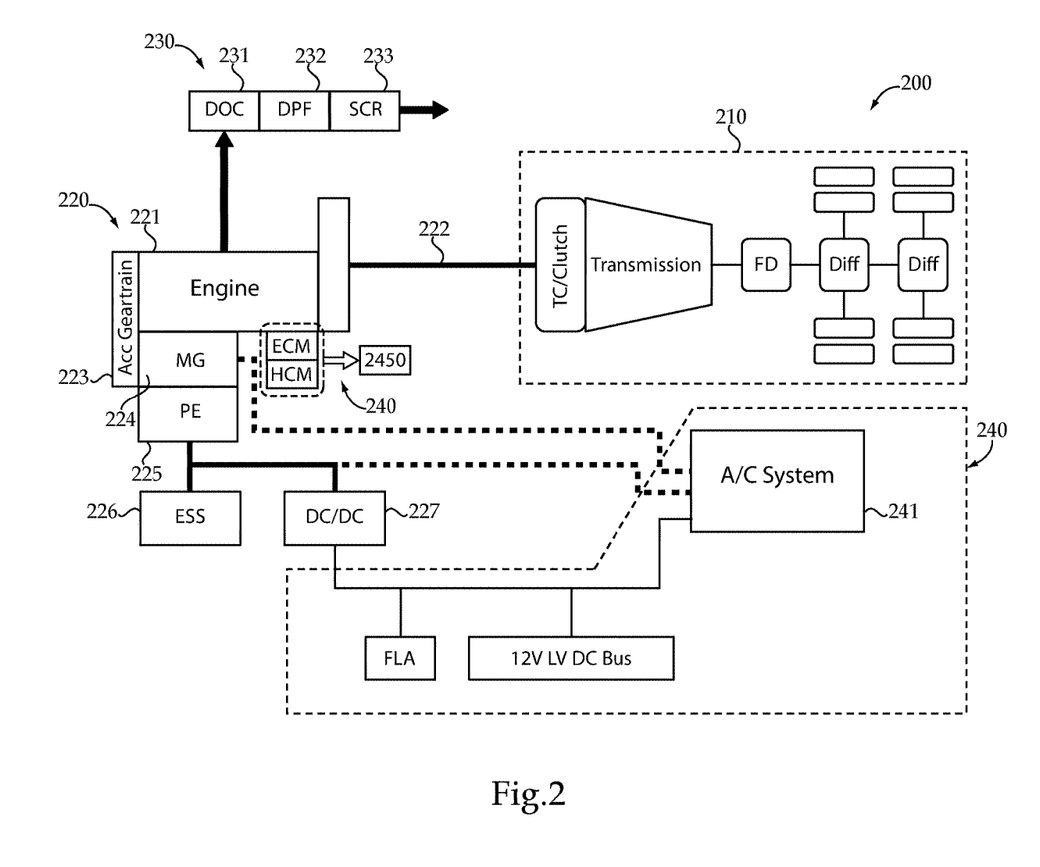
FIG. 2 is a schematic block diagram illustrating an exemplary mild hybrid powertrain system.

With reference to FIG. 2 there is illustrated a schematic block diagram of an exemplary mild hybrid powertrain system 200 structured for use in a vehicle. System 200 comprises a drivetrain 210 which includes a clutch, a transmission, one or more differentials and ground contacting wheels which are driven to provide vehicle propulsion. System 200 further includes a mild hybrid power system 220 including an internal combustion engine 221 structured to output torque to drivetrain 210 via drive shaft 222 and to output torque to accessory drive 223 which may include an accessory geartrain and/or accessory belt drives. An electrical machine 224 such as a motor/generator is operatively coupled with accessory drive 223 and with power electronics 225 which are, in turn, operatively coupled with energy storage system 226 (which may include one or more batteries, ultracapacitors or other types of energy storage devices) and DC/DC converter 227. An aftertreatment system 230 is structured to receive exhaust from engine 221 and reduce emissions thereof, for example, using a diesel oxidation catalyst 230, diesel particulate filter 231, SCR catalyst 233, and heater 234.

A variety of different electrical loads 240 may be operatively coupled with energy storage system 226 and/or DC/DC converter 227. The electrical loads may include an auxiliary power unit (APU) based air conditioning system 241 which may be powered mechanically by electrical machine 224, or electrically at the voltage of energy storage system 226 (e.g., 48V) and/or at a lower voltage provided by DC/DC converter (e.g., 12 V). Any of the other electrical loads described above in connection with system 100 may also be included among electrical loads 240.

During operation of system 200 electrical machine 224 can selectably operate in a torque assist motor mode in which it draws energy from energy storage system 227 and outputs positive torque to accessory drive 223 to assist engine 221 in driving drivetrain 210. Electrical machine 224 can also selectably operate in generator modes in which it receives torque from accessory drive train and generates energy to charge energy storage system 226 and/or power one or more of electrical loads 240. The generator modes may include either or both of a regenerative braking mode in which mechanical torque to drive electrical machine 224 is provided from drivetrain 210 via engine 221 and accessory drive 223 to provide vehicle braking, and an engine charging mode in which mechanical torque output by engine 221 is used to drive electrical machine 224.

System 200 further includes a controller 240 which may be configured to control various operational aspects of system 200. It shall be appreciated that controller 240 may include any of the structural and functional components, features, modifications and variations described above in connection with controller 140. Both controller 140 and controller 240 may include power split controls which shall now be described in further detail in connection with FIG. 3.

Figure 3:
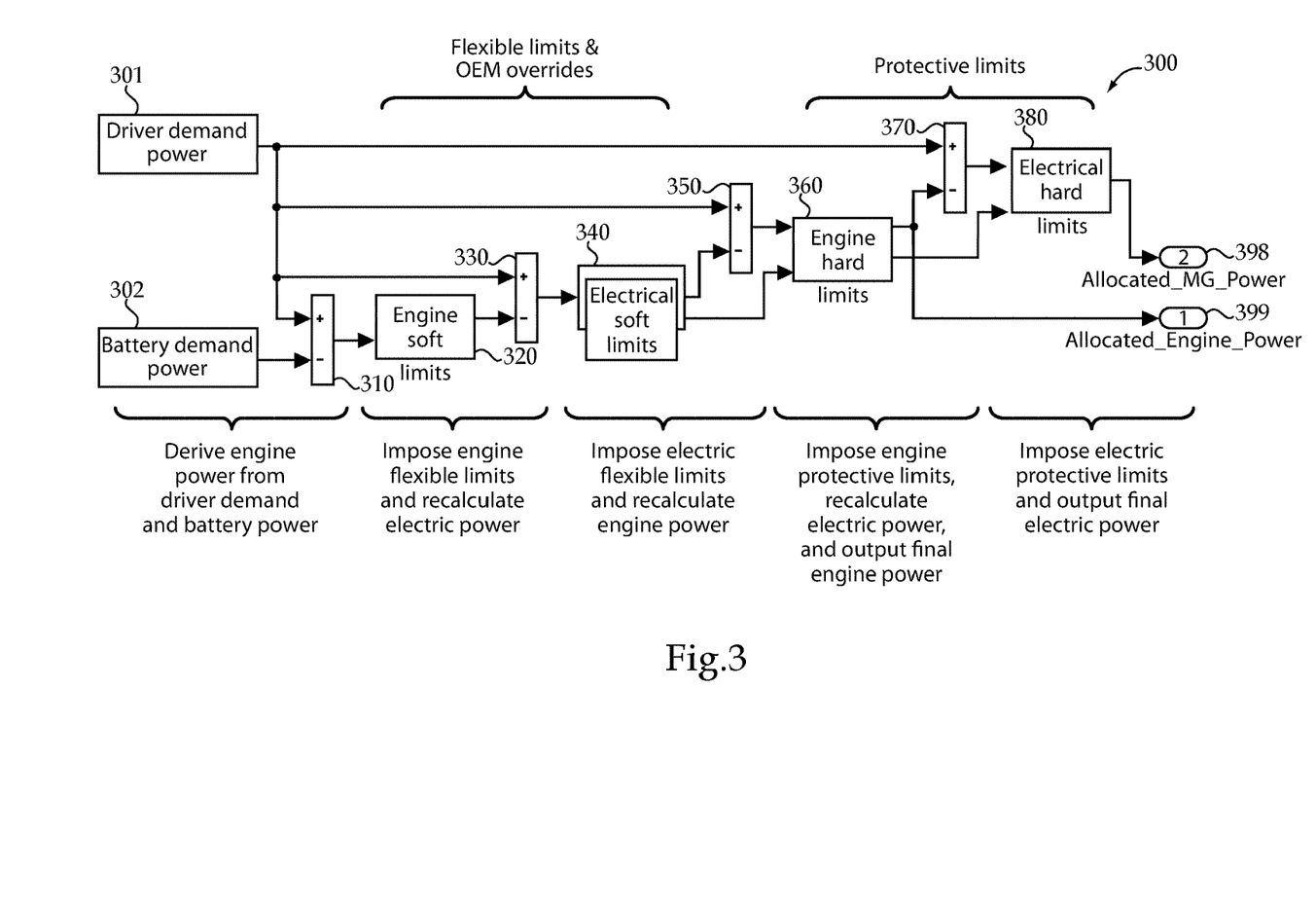
FIG. 3 is a schematic block diagram illustrating exemplary controls for a mild hybrid powertrain system.

With reference to FIG. 3 there is illustrated a flow diagram of exemplary power split controls 300. Controls 300 receives a drive demanded power (Pd) at input 301 and a battery demand power (Pb) at input 302. Pd may be determined based on operator input such as accelerator position, cruise control, and brake position among other possible operator inputs. Pb may be determined based using a technique which determines a desired battery state of charge defined to provide a desired battery state of health or life and may balance those considerations relative to short term battery output capacity goals. Operator 310 calculates an engine power (Pe) based upon the difference of inputs 301 and 302 (Pe=Pd−Pb). Engine power (Pe) is provided to operator 320 which imposes one or more negotiable constraints or flexible limits on engine power (Pe) to determine a constrained engine power (Pe').

Constrained engine power (Pe') and drive demanded power (Pd) are provided to operator 330 which determines a recalculated battery power (Pb') based on the difference between these inputs (Pb'=Pd−Pe'). Recalculated battery power (Pb') is provided to operator 340 which imposes one or more negotiable or flexible constraints on recalculated battery power (Pb') to provide a constrained battery power (Pb"). Constrained battery power (Pb") is provided to operator 350 which determines a recalculated engine power (Pe") based upon Pd and Pb" (Pe"=Pd−Pb"). Recalculated engine power (Pe") is provided to operator 360 which imposes one or more additional hard or protective constraints on recalculated engine power (Pe") to determine a constrained engine power (Pe''').

Constrained engine power (Pe''') is provided to operator 370 which determines a recalculated battery power (Pb''') based upon Pd and Pe''' (Pb'''=Pd−Pe'''). Recalculated battery power (Pb''') is provided to operator 380 which imposes one or more additional hard or protective constraints on Pb''' to determine a constrained battery power (Pb'''). Constrained engine power (Pe''') is provided to output 398 which may be used as an engine power split command or to determine an engine power split command for controlling engine operation. Constrained battery power (Pb''') is provided to output 399 which may be used as an electrical machine power split command or to determine an electrical machine power split command for controlling operation of one or more motor/generators, DC/DC converters, battery systems, and/or other power electronics of a hybrid vehicle system, such as of systems 100 and 200 described above. It shall be appreciated that power split controls 300 are but one illustrative example of controls that determine the power split between an engine and one or more electrical machines in a mild hybrid system. A variety of other power split controls may also be used.

Figure 4:
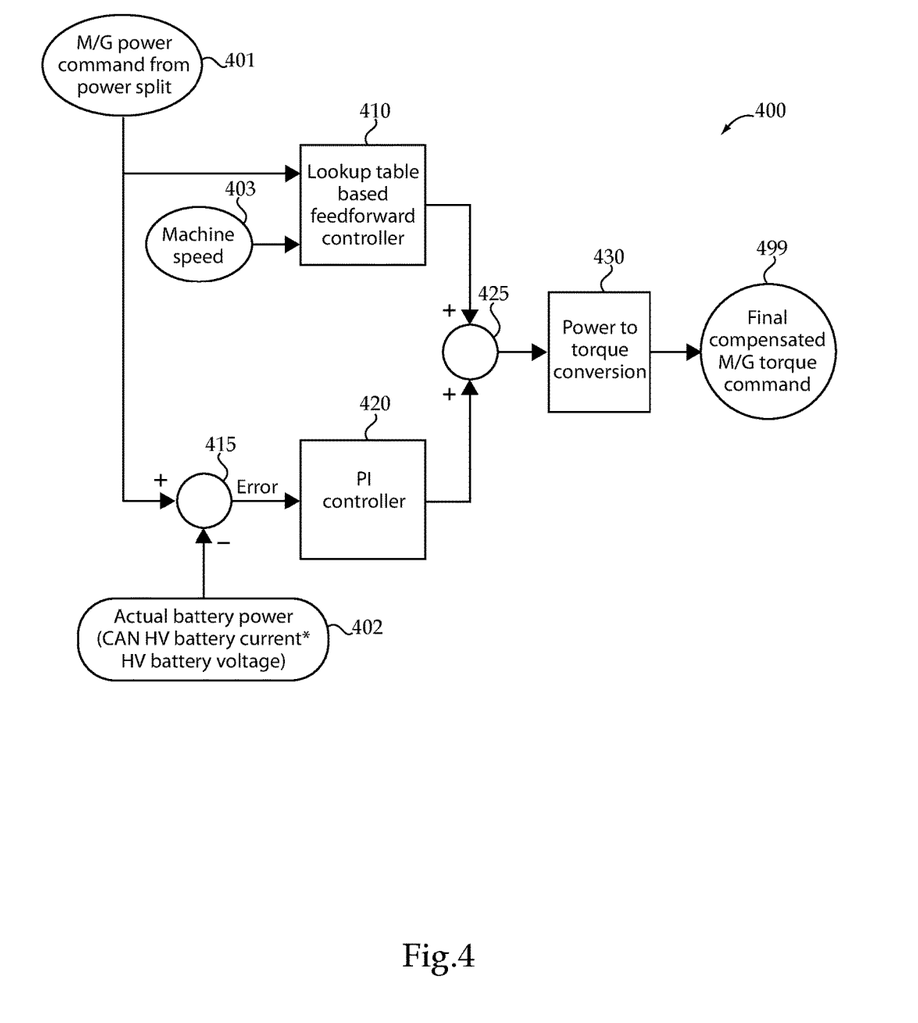
FIG. 4 is a schematic block diagram illustrating exemplary controls for a mild hybrid powertrain system.

With reference to FIG. 4, there are illustrated exemplary error correction controls 400 which may be utilized in connection with controls 300 disclosed herein or other power split controls. The inventors have realized unexpected benefits by correcting unanticipated sources of error that, if left unaccounted for, may introduce errors into power split controls for mild hybrid systems. For example, the inventors have determined that in mild hybrid systems (e.g., systems 100 and 200 described above) may suffer from a number of erroneous operating modalities. For example, during traction and during regeneration, the energy storage system (e.g., high voltage battery) provides power to lower voltage loads circuitry through the DC/DC converter. During regenerative braking, a portion of the energy captured is consumed by the electrical accessories (e.g., the low voltage accessory or high voltage accessories). The power (or torque) commands to the electrical machine during regeneration should preferably account for these losses.

The electrical machines used in mild hybrid systems also fail to provide robust power control at low power (e.g., between −3 kW and +3 kW). In some control modalities although 0 kW is commanded of the electrical machine, the electrical machine ends up charging the energy storage system. Furthermore, the estimated actual torque and current provided by the power electronics have been found to be erroneous. For example, it was observed that inaccuracies in input quantities resulted in error in output torque estimates in certain embodiments estimate motor/generator torque in accordance with Equation 1:

$$T=3/2\times[\psi I\times\sin(\varphi)+1/2\times(L_d-L_q)\times I2\times\sin(\varphi)]$$

One source of robust and reliable information available to the controls was identified as the energy storage system CAN current. It is believed that a primary cause of the aforementioned errors pertains to the degree of calibration of the electrical machine controls or lack thereof. In particular uncertainties or errors in input quantities to the controls result in errors in the commanded torque or power of the electrical machines.

To correct for the aforementioned errors in mild hybrid system controls, proportional integral feedforward (PIF) controls such as controls 400 may be utilized. Controls 400 receive an electrical machine power command at input 402 which may be determined using power split controls (e.g., command 398 from controls 300 or another command for control of a motor generator in a mild hybrid system). Controls 400 also receive an actual battery power at input 402 (e.g., a battery current value broadcast on a CAN bus multiplied by a battery voltage). Controls 400 further receive an electrical machine rotational speed at input 403. Inputs 401 and 403 are provided to operator 410 which is structured as a feed forward-based lookup table controller. Operator 410 determines a first correction parameter for the electrical machine power command and outputs to first correction parameter to operator 425.

Operator 410 preferably accounts and compensates for low voltage accessory power losses and inaccuracies in the estimated actual torque and current provided by the power electronics. Calibration of lookup table based feedforward controls such as those of operator 410 may be achieved off-line. To adjust for the particular variations of each machine, an on-line automated calibration process may be utilized. An exemplary on-line calibration process includes monitoring uncompensated electrical machine output commands and observing the resulting electrical machine output and/or the resulting system output. One process for doing this involves current measurements into/out of the energy storage system (e.g. battery pack) in relation to motor output commands and engine speed. Measured battery current and system voltage may be used to provide a quantification of electric power. A predetermined efficiency map of both the power electronics and the motor-generator may be used to provide a conversion of electric power to mechanical power. A variety of convergence algorithms may be employed to maintain an optimal convergence on the feedforward table values associated with each value of desired power and speed (input axes). Once the table has sufficiently converged the control system will be able provide the first correction parameter provided to operator 425. Certain exemplary on-line calibration processes include measuring current values in to or out of an energy storage system for a plurality of electrical machine outputs and engine speeds, evaluating an error between a commanded output condition and an observed output condition based upon the measured current values, and utilizing a convergence algorithms to determine feedforward table values for the plurality of commanded output conditions and engine speeds.

Operator 415 receives inputs 401 and 402, determined an error or difference between the two received inputs and outputs the error or difference to proportional integral (PI) operator 420. Operator 420 utilizes PI controls to account for power error and compensate for power used to drive low voltage accessories and supplement the feedforward path by driving steady state errors to zero. In further embodiments, controller 420 may also use a variant of PI controls of such as proportional integral derivative (PID) controls.

Operator 420 outputs a second first correction parameter to operator 425. Operator 425 sums the first and second correction parameters received as inputs and outputs final corrected or compensated electrical machine torque or power command 499 which may be used to control operation of an electrical machine. Thus, it shall be appreciated that controls 400 provides a mechanism that can adjust the output commanded torque/power such that the resulting output torque/power matches that of the desired torque/power. The corrections can also be calibrated in real time, thus providing a robust and accurate system performance.

While the invention has been illustrated and described in detail in the drawings and foregoing description, the same is to be considered as illustrative and not restrictive in character, it being understood that only certain exemplary embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," "at least one portion" and the like are used there is no intention to limit the claim to only one item unless specifically stated to the contrary in the claim. When the language "at least a portion" and/or "a portion" is used the item can include a portion and/or the entire item unless specifically stated to the contrary.

The invention claimed is:

1. A mild-hybrid vehicle propulsion system comprising:
an internal combustion engine structured to output torque to propel a vehicle;
a mild hybrid system including an electrical machine operatively coupled with power electronics, an energy storage system operatively coupled with the power electronics, and one or more electrical accessory loads operatively coupled with the power electronics, the mild hybrid system structured to selectably operate in a torque assist mode in which the electrical machine provides torque to assist the engine in propelling the vehicle and to selectably operate in a generator mode in which the electrical machine receives torque and provides power to the energy storage system, the one or more electrical accessory loads, or both the energy storage system and the one or more electrical loads; and an electronic control system including a controller, the controller being structured to:

receive an electrical machine power command based upon a power split between the engine and the electrical machine, process the electrical machine power command with feedforward controls structured to compensate for an inaccuracy of the electrical machine power command arising from at least one of an error in estimated torque of the electrical machine and an error in estimated current provided by the power electronics, process the electrical machine power command with proportional integral (PI) controls structured to compensate for a power loss arising from one or more of energy consumption by the one or more electrical accessory loads, provide a compensated machine power command based upon the processing of the feedforward controls and the processing of the PI controls, and output the compensated machine power command to control the electrical machine.

2. The system of claim 1 wherein the feedforward controls include a lookup table that receives the electrical machine power command and a machine speed as inputs and provides a first correction component based upon said inputs.

3. The system of claim 2 wherein the PI controls receive an error or difference between the electrical machine power command and a power of the energy storage system and provide a second correction component.

4. The system of claim 3 wherein the first correction component and the second correction component are combined to provide the compensated machine power command.

5. The system of claim 2 wherein the feedforward controls calibrate the lookup table using an on-line calibration component during operation of the vehicle.

6. The system of claim 5 wherein the on-line calibration component is structured to
receive values of current input to or output by the energy storage system at a plurality of electrical machine outputs and engine speeds, and
evaluate an error between a commanded output condition and an observed output condition based upon the received current values, and
utilize a convergence algorithm to determine values of the lookup table for the plurality of electrical machine outputs and engine speeds.

7. The system of claim 1 wherein the controller is implemented in a first hardware component that is distinct from a second hardware component which is structured to determine the power split.

8. The system of claim 1 wherein the controller is implemented in a hardware component that is also structured to perform the power split determination.

9. A method of operating a mild-hybrid vehicle propulsion system including an engine structured to propel a vehicle, a motor/generator operatively coupled with power electronics, an energy storage system operatively coupled with the power electronics, the motor/generator structured to selectably operate as a motor to provide output to assist the engine in propelling the vehicle and to selectably operate as a generator, and a controller structured to provide commands for operation of the motor/generator, the method comprising:

receiving with the controller a motor/generator output command in response to an output allocation between the engine and the motor/generator;

providing the motor/generator output command to a feedforward component of the controller structured to compensate for a first effect on the motor/generator output command arising from one or both of an error in estimated torque of the motor/generator and an error in estimated current provided by the power electronics;

providing the motor/generator output command to a proportional integral (PI) component of the controller structured to compensate for a second effect on the motor/generator output command arising from operation of one or more electrical accessories operatively coupled with the power electronics;

providing with the controller a compensated machine output command in response to an output of the feedforward component and an output of the PI component; and controlling the motor/generator using the compensated machine output command.

10. The method of claim 9 wherein the feedforward controls include a lookup table that receives the motor/generator output command and a machine speed as inputs and provides a first correction component based upon said inputs.

11. The method of claim 10 wherein the PI controls receive an error or difference between the motor/generator output command and a power of the energy storage system and provide a second correction component.

12. The method of claim 11 wherein the first correction component is combined with the second correction component to provide the compensated machine output command.

13. The method of claim 10 further comprising calibrating the lookup table during operation of the vehicle, the calibrating comprising:
determining values of current input to or output by the energy storage system at a plurality of motor/generator outputs and engine speeds, and
evaluating a variance between a commanded output condition and an observed output condition based upon the values of current.

14. The method of claim 13 the calibration further comprises utilizing a convergence technique to determine values of the lookup table for the plurality of motor/generator outputs and engine speeds.

15. An electronic control system structured to control a mild-hybrid vehicle propulsion system including an engine, a motor/generator operatively coupled with power electronics, an energy storage system operatively coupled with the power electronics, and an electrical accessory operatively coupled with the power electronics, the motor/generator structured to selectably operate as a motor to provide output to assist the engine and to selectably operate as a generator mode to receives input to generate power, the electronic control system comprising:
an output allocation component structured to provide a motor/generator output command;
a feedforward controller structured to receive the motor/generator output command and provide a first compensation for at least one of an error in estimated torque of the motor/generator and an error in estimated current provided by the power electronics, a proportional integral (PI) controller structured to receive the motor/generator output command and provide a second compensation for an effect on the motor/generator output command due to power consumed by one or more electrical accessories operatively coupled with the power electronics; and a command output component structured to provide a compensated machine output command using the first compensation and the second compensation and to output the compensated machine output command to control the motor/generator.

16. The electronic control system of claim 15 wherein the feedforward controller utilizes a lookup table that receives the motor/generator output command and a machine speed as inputs and provides the first output based upon said inputs.

17. The electronic control system of claim 16 wherein the feedforward controls calibrate the lookup table using an on-line calibration.

18. The electronic control system of claim 17 wherein the on-line calibration is structured to:

receive current measurements of the energy storage system at a plurality of motor/generator outputs and engine speeds, and evaluate an error between a commanded output condition and an observed output condition based upon the measured current values, and utilize a convergence technique to determine values of the lookup table for the plurality of motor/generator outputs and engine speeds.

19. The electronic control system of claim 15 wherein the output allocation component, the feedforward controller, the PI controller and the command output component are implemented in a common hardware unit.

20. The electronic control system of claim 15 wherein the output allocation component, the feedforward controller, the PI controller and the command output component are implemented in two or more hardware units in operative communication with one another.

21. The system of claim 1 wherein the one or more electrical accessory loads comprise one or more of an electric air compressor component, an electric power steering component, an electric air conditioning component, an auxiliary power unit component and an electric heater component.

22. The method of claim 9 wherein the error in estimated torque of the motor/generator and the error in estimated current provided by the power electronics are caused by a control calibration of the motor/generator.

23. The electronic control system of claim 15 wherein the accessories include low voltage accessories structured to operate at a lower voltage than the motor/generator.

* * * * *